US009701196B2

(12) United States Patent
Mita (10) Patent No.: US 9,701,196 B2
(45) Date of Patent: Jul. 11, 2017

(54) FOUR-WHEEL-DRIVE VEHICLE

(71) Applicant: JTEKT Corporation, Osaka-shi (JP)

(72) Inventor: Masaki Mita, Chiryu (JP)

(73) Assignee: JTEKT CORPORATION, Osaka-shi (JP)

( * ) Notice: Subject to any disclaimer, the term of this patent is extended or adjusted under 35 U.S.C. 154(b) by 249 days.

(21) Appl. No.: 14/071,785

(22) Filed: Nov. 5, 2013

(65) Prior Publication Data

US 2014/0136062 A1     May 15, 2014

(30) Foreign Application Priority Data

Nov. 15, 2012    (JP) ................................. 2012-250897

(51) Int. Cl.
    *B60K 23/08*        (2006.01)
    *B60K 17/344*      (2006.01)
    *B60K 17/35*        (2006.01)

(52) U.S. Cl.
    CPC .......... *B60K 23/08* (2013.01); *B60K 23/0808* (2013.01); *B60K 17/344* (2013.01); *B60K 17/35* (2013.01); *B60K 2023/0833* (2013.01); *B60K 2023/0858* (2013.01); *B60W 2540/06* (2013.01); *B60W 2550/148* (2013.01)

(58) Field of Classification Search
None
See application file for complete search history.

(56) References Cited

U.S. PATENT DOCUMENTS 4,678,056 A   *   7/1987   Kobari ................... B60K 23/08
                                                                  180/167
4,866,624 A   *   9/1989   Nishikawa ......... B60K 23/0808
                                                                  180/197
(Continued)

FOREIGN PATENT DOCUMENTS

JP        H05-338457 A      12/1993
JP        2009-166706 A     7/2009
JP        2012-61923         3/2012

OTHER PUBLICATIONS

Japanese Office Action dated Jun. 14, 2016 in Japanese Patent Application No. 2012-250897 w/partial translation.

*Primary Examiner* — Rami Khatib
*Assistant Examiner* — Nicholas K Wiltey
(74) *Attorney, Agent, or Firm* — Oblon, McClelland, Maier & Neustadt, L.L.P.

(57) ABSTRACT

A four-wheel-drive vehicle includes a first driving force transmission system and a second driving force transmission system. A control device controls the second driving force transmission system. The control device includes a road surface state determination section that determines whether a coefficient of friction of a road surface is equal to or higher than a predetermined value based on an index value regarding the coefficient of friction of the road surface, controls a dog clutch such that the dog clutch is engaged irrespective of the index value regarding the coefficient of friction of the road surface when an ignition switch is brought into the on-state, and controls the dog clutch such that the dog clutch is brought into the disengaged state when it is determined that the coefficient of friction of the road surface is equal to or higher than the predetermined value.

8 Claims, 4 Drawing Sheets

(56) References Cited

U.S. PATENT DOCUMENTS

| | | | | |
|---|---|---|---|---|
| 5,803,197 A | * | 9/1998 | Hara | B60K 23/0808 |
| | | | | 180/248 |
| 6,341,541 B1 | * | 1/2002 | Sakamoto | B60K 6/36 |
| | | | | 74/665 A |
| 8,825,324 B2 | * | 9/2014 | Horaguchi | B60K 17/344 |
| | | | | 701/53 |
| 2008/0189040 A1 | * | 8/2008 | Nasu | G08G 1/163 |
| | | | | 701/301 |
| 2009/0076696 A1 | * | 3/2009 | Perkins | B60K 23/08 |
| | | | | 701/69 |
| 2013/0226421 A1 | | 8/2013 | Horaguchi et al. | |

* cited by examiner

FOUR-WHEEL-DRIVE VEHICLE

INCORPORATION BY REFERENCE

The disclosure of Japanese Patent Application No. 2012-250897 filed on Nov. 15, 2012 including the specification, drawings and abstract, is incorporated herein by reference in its entirety.

BACKGROUND OF THE INVENTION

1. Field of the Invention

The invention relates to a four-wheel-drive vehicle.

2. Description of Related Art

There has been conventionally known a four-wheel-drive vehicle in which driving force is always transmitted from a drive source (engine) to a pair of right and left main drive wheels (front wheels) and driving force is transmitted from the drive source to a pair of right and left auxiliary drive wheels (rear wheels) via a plurality of clutches (refer to Japanese Patent Application Publication No. 2012-61923 (JP 2012-61923 A)).

In the four-wheel-drive vehicle described in JP 2012-61923 A, a dog clutch is arranged between the drive source and a propeller shaft, which transmits driving force in the longitudinal direction of the vehicle. In addition, in the four-wheel-drive vehicle, a multi-disc clutch is arranged between the auxiliary drive wheels and a differential unit on the auxiliary drive wheel side, to which the driving force is transmitted through the propeller shaft. When the vehicle travels in a two-wheel-drive mode where the driving force is transmitted only to the main drive wheels, transmission of the driving force by the dog clutch and the multi-disc clutch is interrupted to suppress the rotation of the propeller shaft and the rotation of a differential case of the differential unit on the auxiliary drive wheel side. Thus, travel resistance (friction loss) is reduced and thereby fuel efficiency is improved.

In the four-wheel-drive vehicle described in JP 2012-61923 A, if the main drive wheels slip at the time when the vehicle starts in the two-wheel drive mode, it may not be possible to shift the vehicle into the four-wheel-drive mode because recessed portions and projected portions in the dog clutch cannot be engaged with each other. Therefore, there is provided a control device that controls the dog clutch such that the recessed portions and the projected portions are engaged with each other in advance before the vehicle starts when it is determined that the coefficient of friction of a road surface is low.

Such a four-wheel-drive vehicle may be started immediately after the drive source is actuated in response to a driver's operation of an ignition switch. In such a case, because the vehicle starts before the control device determines whether the coefficient of friction of the road surface is low, the dog clutch cannot be engaged before the vehicle starts. Therefore, when the main drive wheels slip, it may not be possible to converge the slip of the main drive wheels by shifting the vehicle into the four-wheel drive mode. The four-wheel-drive vehicle described in JP 2012-61923 A still has room for improvement in this respect.

SUMMARY OF THE INVENTION

One object of the invention is to provide a four-wheel-drive vehicle configured such that a dog clutch in a driving force transmission system is reliably engaged before the vehicle starts.

An aspect of the invention relates to a four-wheel-drive vehicle including: a drive source that generates driving force for a vehicle; a first driving force transmission system that transmits the driving force to main drive wheels; a second driving force transmission system that transmits the driving force to auxiliary drive wheels; an operation receiving device that receives a starting operation for starting the drive source; and a control device that controls the second driving force transmission system. The second driving force transmission system includes a dog clutch that transmits the driving force when a recessed portion and a projected portion of the dog clutch are engaged with each other, and a driving force transmission device that is able to continuously adjust the driving force to be transmitted. The control device includes a road surface state determination section that determines whether a coefficient of friction of a road surface is equal to or higher than a predetermined value based on an index value regarding the coefficient of friction of the road surface, controls the dog clutch such that the recessed portion and the projected portion are engaged each other irrespective of the index value regarding the coefficient of friction of the road surface when the operation receiving device receives the starting operation, and controls the dog clutch such that engagement between the recessed portion and the projected portion is cancelled when the road surface state determination section determines that the coefficient of friction of the road surface is equal to or higher than the predetermined value.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
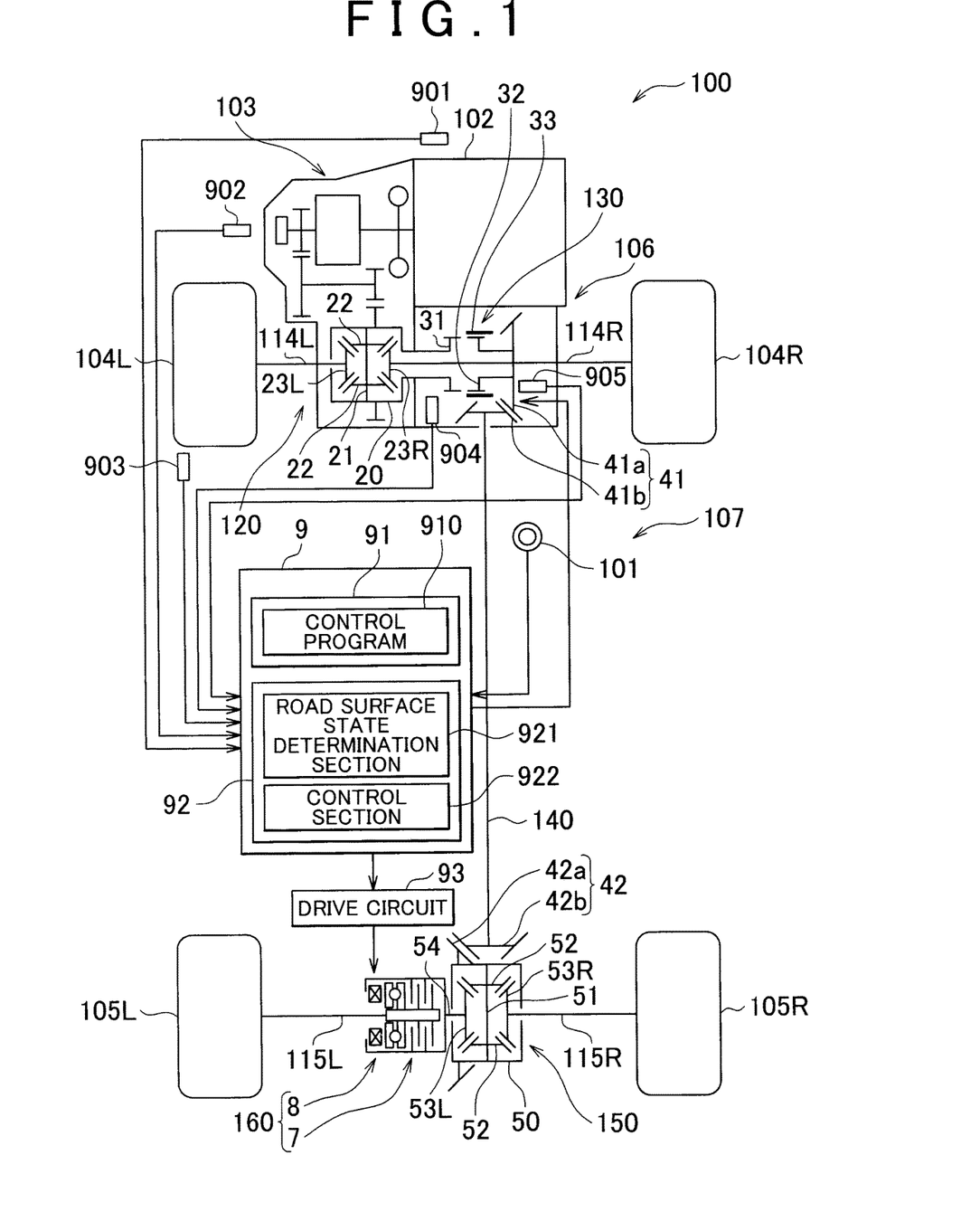
FIG. 1 is a schematic view illustrating an example of the configuration of a four-wheel-drive vehicle according to an embodiment of the invention.

FIG. 1 is a schematic view illustrating an example of the configuration of a four-wheel-drive vehicle 100 according to an embodiment of the invention. The four-wheel-drive vehicle 100 includes an ignition switch 101, an engine 102, a transmission 103, a pair of right and left front wheels 104R, 104L, a pair of right and left rear wheels 105R, 105L, a first driving force transmission system 106, and a second driving force transmission system 107. The engine 102 is started in response to an operation of the ignition switch 101. The transmission 103 is a shifting device that changes the speed of rotation output from the engine 102. The first driving force transmission system 106 transmits the driving force output from the engine 102 to the front wheels 104R, 104L. The second driving force transmission system 107 transmits the driving force output from the engine 102 to the rear wheels 105R, 105L. The front wheels 104R, 104L are main drive wheels to which the driving force is always transmitted from the engine 102 while the four-wheel-drive vehicle 100 is travelling. The rear wheels 105R, 105L are auxiliary drive wheels to which a required torque is transmitted depending on a travelling state.

The ignition switch 101 is turned on when a driver turns a key. The ignition switch 101 is an example of an operation receiving device that receives a starting operation (turning of the key) that the driver of the four-wheel-drive vehicle 100 performs in order to start the engine 102. The engine 102 is an example of a drive source that generates a driving force for causing the four-wheel-drive vehicle 100 to travel by burning liquid fuel. As the drive source, an electric motor may be provided in addition to the engine 102. Alternatively, the electric motor may be used as a single drive source. As the operation receiving device, a pushbutton switch may be used.

The first driving force transmission system 106 includes a front differential 120 and drive shafts 114R, 114L. The drive shafts 114R, 114L transmit the torque output from the front differential 120 to the right and left front wheels 104R, 104L, respectively. The second driving force transmission system 107 includes a dog clutch 130, a propeller shaft 140, a rear differential 150, and a driving force transmission device 160.

The front differential 120 includes a differential case 20, a pinion shaft 21, a pair of pinion gears 22, and a pair of side gears 23R, 23L. The differential case 20 is rotated by the torque output from the transmission 103. The pinion shaft 21 is held by the differential case 20. The pinion gears 22 are rotatably supported by the pinion shaft 21. The side gears 23R, 23L mesh with the pinion gears 22 with their gear axes orthogonal to the gear axes of the pinion gears 22. The front differential 120 is configured to distribute torque to the left front wheel 104L such that the torque is transmitted from the left side gear 23L to the left front wheel 104L via the left drive shaft 114L. The front differential 120 is configured to distribute torque to the right front wheel 104R such that the torque is transmitted from the right side gear 23R to the right front wheel 104R via the right drive shaft 114R.

The dog clutch 130 includes a first tooth portion 31, a second tooth portion 32, and a tubular sleeve 33. The first tooth portion 31 is fixed to an outer peripheral portion of the differential case 20 of the front differential 120 so as to be non-rotatable relative to the differential case 20. The second tooth portion 32 is fixed to a ring gear 41a (described later) so as to be non-rotatable relative to the ring gear 41a. The sleeve 33 is allowed to be advanced and retracted along the direction of a rotation axis of the differential case 20. The dog clutch 130 is configured such that the movement of the tubular sleeve 33 along one direction connects the first tooth portion 31 and the second tooth portion 32 to each other so that torque is transmittable therebetween, and the movement of the tubular sleeve 33 along the other direction disconnects the first tooth portion 31 and the second tooth portion 32 from each other. The detailed configuration of the dog clutch 130 will be described later.

A first gear mechanism 41 including the ring gear 41a and a pinion gear 41b is provided on the front-wheel side of the propeller shaft 140. The ring gear 41a is formed of a bevel gear that rotates together with the second tooth portion 32 of the dog clutch 130. The pinion gear 41b is formed of a bevel gear that meshes with the ring gear 41a and that is fixed to one end of the propeller shaft 140.

A second gear mechanism 42 including a ring gear 42a and a pinion gear 42b is provided on the rear-wheel side of the propeller shaft 140. The ring gear 42a is a bevel gear fixed to a differential case 50 of the rear differential 150. The pinion gear 42b is formed of a bevel gear that meshes with the ring gear 42a and that is fixed to the other end of the propeller shaft 140.

The rear differential 150 includes the differential case 50, a pinion shaft 51, a pair of pinion gears 52, and a pair of side gears 53R, 53L. The differential case 50 is rotated by the torque transmitted via the propeller shaft 140. The pinion shaft 51 is held by the differential case 50. The pinion gears 52 are rotatably supported by the pinion shaft 51. The side gears 53R, 53L mesh with the pinion gears 52 with their gear axes orthogonal to the gear axes of the pinion gears 52. The left side gear 53L is connected to an intermediate shaft 54 arranged between the left side gear 53L and the driving force transmission device 160 so as to be non-rotatable relative to the intermediate shaft 54. The right side gear 53R is connected to a right drive shaft 115R so as to rotate at the same velocity as the right drive shaft 115R.

The driving force transmission device 160 includes a multi-disc clutch 7 and a pressing mechanism 8. The pressing mechanism 8 presses the multi-disc clutch 7 with a variable pressing force. The driving force transmission device 160 is configured so as to transmit a torque corresponding to the pressing force with which the pressing mechanism 8 presses the multi-disc clutch 7, from the intermediate shaft 54 to the left drive shaft 115L side. The detailed configuration of the driving force transmission device 160 will be described later.

The four-wheel-drive vehicle 100 includes an electronic control unit (ECU) 9 as a control device that controls the second driving force transmission system 107. The ECU 9 is able to obtain values output from a coolant temperature sensor 901, an oil temperature sensor 902, an ambient temperature sensor 903, a first rotational speed sensor 904, and a second rotational speed sensor 905 via an in-vehicle communication network (controller area network (CAN)) (not shown). The coolant temperature sensor 901 detects a temperature of the coolant in the engine 102. The oil temperature sensor 902 detects a temperature of the oil in the transmission 103. The ambient temperature sensor 903 detects an ambient temperature. The first rotational speed sensor 904 detects a rotational speed of the differential case 20 of the front differential 120. The second rotational speed sensor 905 detects a rotational speed of the ring gear 41a of the first gear mechanism 41. The ECU is able to obtain a vehicle speed, rotational speeds of the front wheels 104R, 104L and the rear wheels 105R, 105L, information output from a steering device (not shown), and the like via the in-vehicle communication network. Moreover, a drive circuit 93 that outputs a current for driving the pressing mechanism 8 of the driving force transmission device 160 is connected to the ECU 9.

The ECU 9 includes a storage unit 91 and a control unit 92. The storage unit 91 is formed of storage elements, such as a read only memory (ROM) and a random access memory (RAM). The control unit 92 is formed of a central processing unit (CPU) that operates according to a control program 910 stored in the storage unit 91. As the control unit 92 operates according to the control program 910, the control unit functions as a road surface state determination section 921 that determines the coefficient of friction of a road surface on the basis of an index value regarding the coefficient of friction of the road surface, and functions as a control section 922 that controls the dog clutch 130 and the driving force transmission device 160.

The drive circuit 93 receives a control signal from the ECU 9 (control section 922), and supplies a current to a magnet coil (described later) that constitutes the pressing mechanism 8. The drive circuit 93 includes a current output circuit that outputs a current, for example, under pulse width modulation (PWM) control, and is able to continuously adjust the amount of a current that is supplied to the pressing mechanism 8 to a value according to the control signal from the ECU 9.

With the above-described configuration, the first driving force transmission system 106 distributes torque to the front wheels 104R, 104L such that the torque is transmitted from the side gears 23R, 23L of the front differential 120 to the front wheels 104R, 104L via the right and left drive shafts 114R, 114L. The second driving force transmission system 107 distributes torque to the rear wheels 115R, 115L such that the torque is transmitted from the differential case 20 of the front differential 120 via the dog clutch 130, the first gear mechanism 41, the propeller shaft 140, the second gear mechanism 42, and the rear differential 150 to the left rear wheel 105L through the left drive shaft 115L with the driving force transmission device 160 interposed between the rear differential 150 and the left drive shaft 115L, and to the right rear wheel 105R through the right drive shaft 115R.

Figure 2:
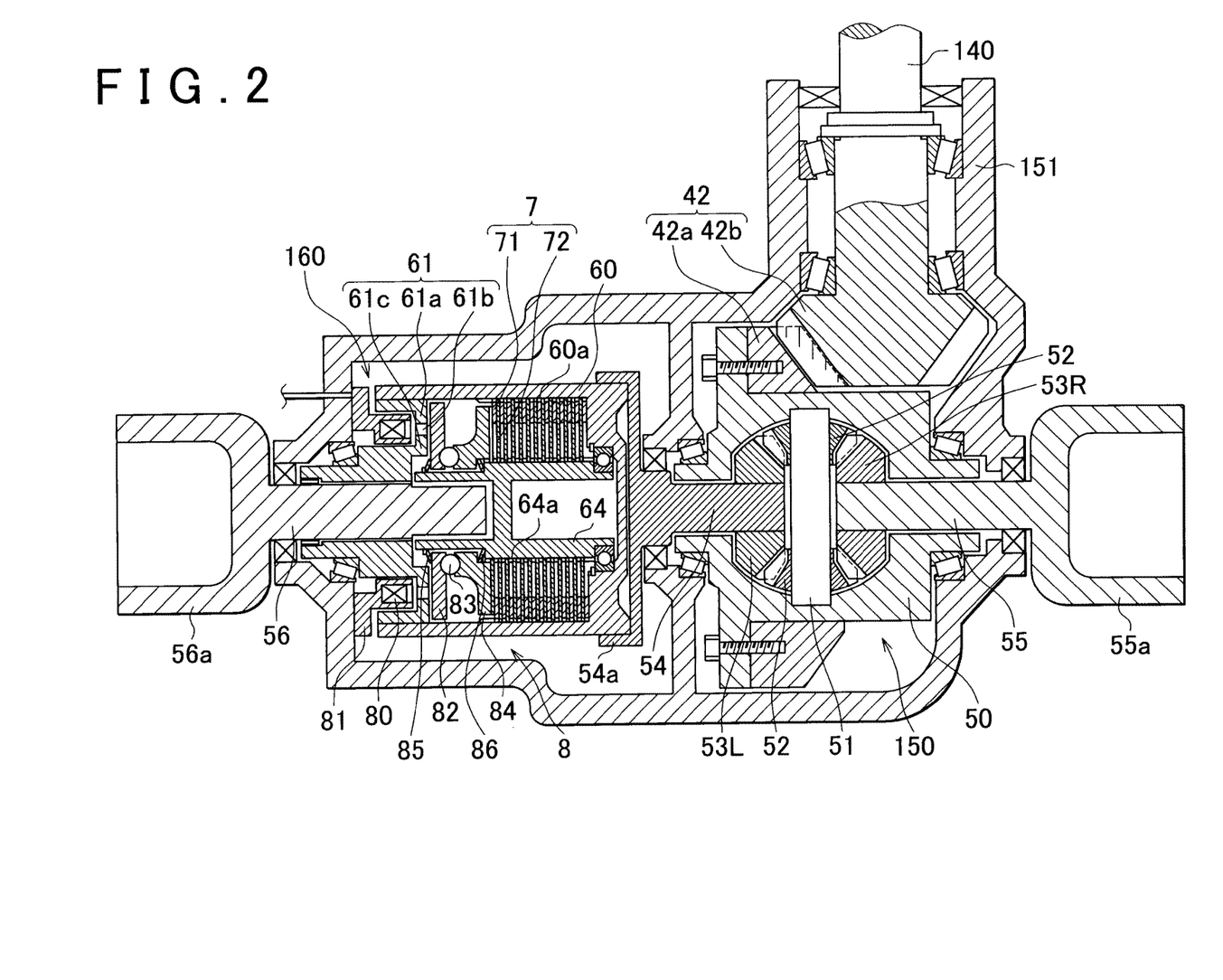
FIG. 2 is a sectional view illustrating an example of the configuration of a driving force transmission device and its surroundings.

FIG. 2 is a sectional view illustrating an example of the configuration of the driving force transmission device 160 and its surroundings. The driving force transmission device 160 is housed in a differential carrier 151 together with the rear differential 150. The driving force transmission device 160 includes a bottomed cylindrical outer housing 60 that is connected to the intermediate shaft 54 so as to be non-rotatable relative to the intermediate shaft 54. The multi-disc clutch 7 and the pressing mechanism 8 are arranged inside the outer housing 60.

The outer housing 60 is connected, at an outer peripheral face of its bottom portion, to a flange 54a of the intermediate shaft 54 so as to rotate together with the intermediate shaft 54. Further, a spline portion 60a having a plurality of spline teeth extending in the axial direction is formed in an inner peripheral face of a cylindrical portion of the outer housing 60, and an open end portion of the outer housing 60 is blocked by an annular rear housing 61.

The rear housing 61 has a first element 61a, a ring-shaped second element 61b, and a third element 61c. The first element 61a is made of a magnetic material fixed to an opening portion of the outer housing 60 by fixing means, such as screwing or welding, so as to be non-rotatable relative to the outer housing 60. The second element 61b is made of a nonmagnetic material fixed to an inner side portion of the first element 61a. The third element 61c is made of a magnetic material fixed to an inner side portion of the second element 61b.

A cylindrical inner shaft 64 supported so as to be coaxial with the outer housing 60 and rotatable relative to the outer housing 60 is arranged radially inward of the outer housing 60. A spline portion 64a having a plurality of spline teeth extending in the axial direction is formed in an outer peripheral face of the inner shaft 64, within a region that faces the spline portion 60a of the outer housing 60. Further, a columnar member 56 having an outer ring 56a of a constant-velocity joint, to which one end of the left drive shaft 115L (illustrated in FIG. 1) is oscillatably connected, is spline-fitted to an inner peripheral face of the inner shaft 64 so as to be non-rotatable relative to the inner shaft 64.

The multi-disc clutch 7 is configured such that a plurality of annular outer clutch plates 71 and a plurality of annular inner clutch plates 72 are alternately arranged in the axial direction. A plurality of projections that engage with the spline portion 60a of the outer housing 60 is formed on an outer peripheral edge of each output clutch plate 71. Further, a plurality of projections that engage with the spline portion 64a of the inner shaft 64 is formed on an inner peripheral edge of each of the inner clutch plates 72. With this configuration, the rotation of the outer clutch plates 71 relative to the outer housing 60 and the rotation of the inner clutch plates 72 relative to the inner shaft 64 are restricted, and the outer clutch plates 71 and the inner clutch plates 72 are movable relative to the outer housing 60 and the inner shaft 64 in the axial direction, respectively.

The pressing mechanism 8 is arranged next to the multi-disc clutch 7 in the axial direction. The pressing mechanism 8 includes a magnet coil 80, a yoke 81, an annular first cam member 82, an annular second cam member 84, and spherical cam followers 83. The yoke 81 is made of a magnetic material that supports the magnet coil 80. The second cam member 84 is arranged so as to face the first cam member 82. The cam followers 83 are interposed between the first cam member 82 and the second cam member 84.

The magnet coil 80 is arranged such that the rear housing 61 is interposed between the magnet coil 80 and the first cam member 82. The magnet coil 80 is configured such that the first cam member 82 is attracted toward the rear housing 61 by a magnetic force generated upon energization of the magnet coil 80.

The second cam member 84 is arranged such that one axial side surface thereof faces the inner clutch plate 72 that is closest to the pressing mechanism 8 among the inner clutch plates 72 of the multi-disc clutch 7. The second cam member 84 has a plurality of projections that engage with the spline portion 64a of the inner shaft 64, at a portion of its inner peripheral face. The rotation of the second cam member 84 relative to the inner shaft 64 is restricted, and the second cam member 84 is movable relative to the inner shaft 64 in the axial direction.

Opposed faces of the first cam member 82 and the second cam member 84 have cam faces formed of inclined surfaces that are formed such that the depth thereof in the axial direction changes along the circumferential direction. A plurality of rolling elements (cam followers) 83 are arranged so as to roll along the cam faces of the first cam member 82 and the second cam member 84. Further, the first cam member 82 is urged by a disc spring 85 and the second cam member 84 is urged by a disc spring 86 so as to approach each other.

With the above-described configuration, when the first cam member 82 frictionally slides on the rear housing 61 due to the magnetic force of the magnet coil 80, the first cam member 82 receives a rotative force from the rear housing 61 and the first cam member 82 and the second cam member 84 are rotated relative each other by the rotative force. A thrust in the axial direction is generated as the rolling elements 83 are rolled on the cam faces of the first cam member 82 and the second cam member 84 by the relative rotation, and the second cam member 84 that receives the thrust presses the multi-disc clutch 7.

Because the rotative force that the first cam member 82 receives from the rear housing 61 changes on the basis of the magnitude of the magnetic force of the magnet coil 80, the pressing force for pressing the multi-disc clutch 7 can be adjusted by controlling a current that is supplied to the magnet coil 80, and consequently, the torque transmitted via the multi-disc clutch 7 can be adjusted. That is, the multi-disc clutch 7 is able to continuously adjust the driving force that is transmitted toward the rear wheels 105R, 105L in multiple stages or without stage.

If energization to the magnet coil 80 is cancelled, the first cam member 82 is separated from the rear housing 61 by the spring force of the disc spring 85 and the first cam member 82 no longer receives a rotative force with which the first cam member rotates relative to the second cam member 84. Thus, the thrust in the axial direction disappears and the second cam member 84 is moved in a direction away from the multi-disc clutch 7 by the spring force of the disc spring 86.

With the above-described configuration, the driving force transmitted to the left side gear 53L of the rear differential 150 is adjusted by the driving force transmission device 160, which allows or interrupts transmission of the driving force, and is then transmitted to the left rear wheel 105L via the columnar member 56 and the left drive shaft 115L. In addition, the driving force transmitted to the right side gear 53R of the rear differential 150 is transmitted to the right rear wheel 105R via a columnar member 55, which is connected to the side gear 53R so as to be non-rotatable relative to the side gear 53R, and the right drive shaft 115R oscillatably connected to an outer ring 55a of a constant-velocity joint provided at one end of the columnar member 55.

Figure 3A:
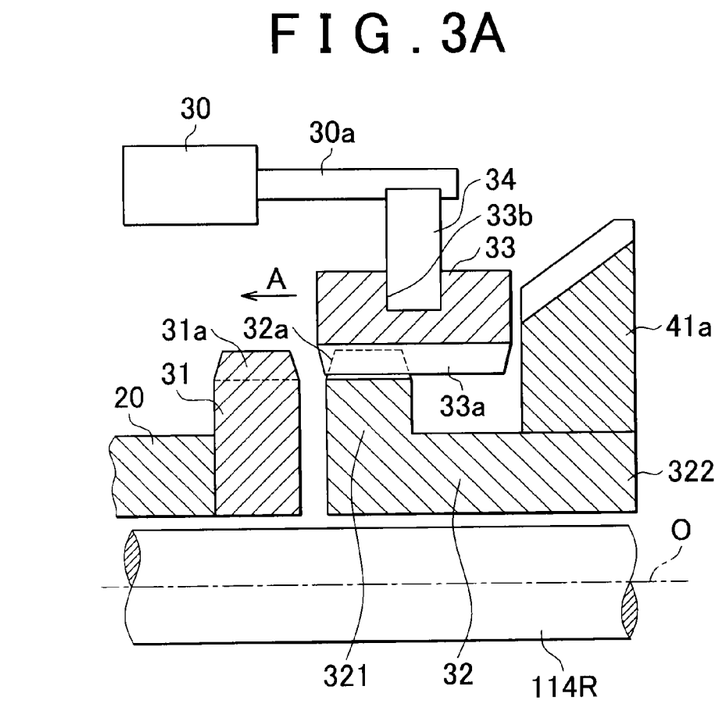
FIG. 3A is a sectional view illustrating an example of the configuration of a dog clutch and its surroundings.
Figure 3B:
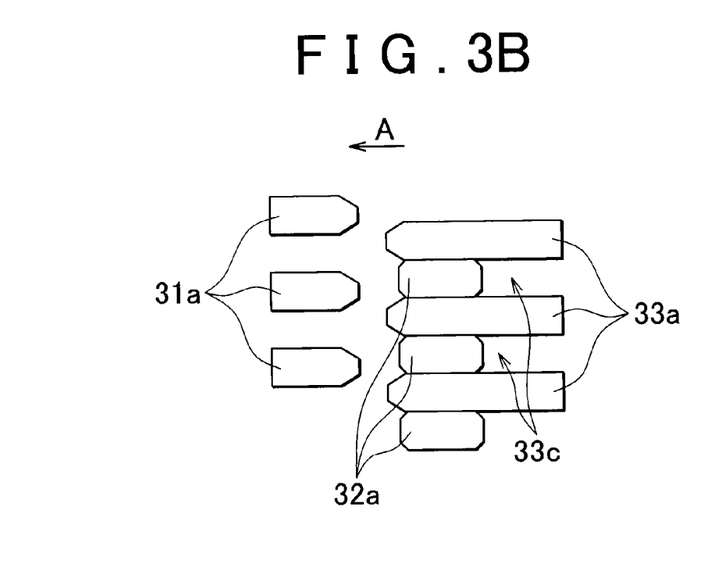
FIG. 3B is an explanatory view schematically illustrating engagement portions of the dog clutch in a disengaged state.

FIG. 3A is a sectional view illustrating an example of the configuration of the dog clutch 130 and its surroundings. FIG. 3B is an explanatory view schematically illustrating engagement portions of the dog clutch 130 in a disengaged state.

The dog clutch 130 includes the first tooth portion 31, the second tooth portion 32, the tubular sleeve 33, and an actuator 30, as described above. The first tooth portion 31 is fixed to the differential case 20 of the front differential 120 so as to be non-rotatable relative to the differential case 20. The second tooth portion 32 is fixed to the ring gear 41a so as to be non-rotatable relative to the ring gear 41a. The sleeve 33 is able to be advanced and retracted along the direction of the rotation axis of the differential case 20. The actuator 30 advances and retracts the sleeve 33. The actuator 30 is formed of, for example, an electromagnetic actuator in which a movable core is moved by a magnetic force generated upon energization of an exciting coil.

The first tooth portion 31 is an annular member. The drive shaft 114R connected to the right front wheel 104R is passed through the first tooth portion 31 so as to be located radially inward of the first tooth portion 31. A plurality of spline teeth 31a extending along a rotation axis O of the differential case 20 is formed on an outer peripheral face of the first tooth portion 31.

The second tooth portion 32 is a tubular member. The drive shaft 114R is passed through the second tooth portion 32 so as to be located radially inward of the second tooth portion 32. The second tooth portion 32 is rotatable relative to the first tooth portion 31 on the same axis. A plurality of spline teeth 32a extending along the rotation axis O of the differential case 20 is formed on an outer peripheral face of the second tooth portion 32.

The sleeve 33 is a tubular connecting member that is arranged radially outward of the first tooth portion 31 and the second tooth portion 32, and that is supported so as to be movable in the axial direction on the same axis as the first tooth portion 31 and the second tooth portion 32. A plurality of spline teeth 33a engageable with the spline teeth 31a of the first tooth portion 31 and the spline teeth 32a of the second tooth portion 32 is formed on an inner peripheral face of the sleeve 33. Recessed portions 33c, with which the spline teeth 31a, 32a serving as projected portions are engaged, are formed between the spline teeth 33a that are adjacent to each other. The dog clutch 130 transmits driving force when the spline teeth 31a, 32a are engaged with the recessed portions 33c.

Further, an engagement recess 33b is formed in an outer peripheral face of the sleeve 33. The engagement recess 33b is formed in an annular shape so as to extend along the circumferential direction of the sleeve 33. One end portion of a moving member 34 that moves the sleeve 33 in the axial direction is slidably engaged with the engagement recess 33b. The other end portion of the moving member 34 is fitted to a shaft 30a of the actuator 30. The actuator 30 advances and retracts the shaft 30a in a direction parallel to the rotation axis O of the differential case 20 according to a control signal from the ECU 9 (illustrated in FIG. 1), and accordingly the moving member 34 and the sleeve 33 are moved in the axial direction along the rotation axis O.

The first tooth portion 31 and the second tooth portion 32 are rotatable relative to each other when the dog clutch 130 is in the disengaged state where the spline teeth 33a of the sleeve 33 are engaged with the spline teeth 32a of the second tooth portion 32 but are not engaged with the spline teeth 31a of the first tooth portion 31. The first tooth portion 31 and second tooth portion 32 are connected to each other so as to be non-rotatable relative to each other when the dog clutch 130 is in the engaged state where the spline teeth 33a of the sleeve 33 are engaged with both the spline teeth 31a of the first tooth portion 31 and the spline teeth 32a of the second tooth portion 32.

When the four-wheel-drive vehicle 100 is travelling in the four-wheel-drive mode, the magnet coil 80 is energized to allow torque transmission by the driving force transmission device 160, and the sleeve 33 of the dog clutch 130 is engaged with both the first tooth portion 31 and the second tooth portion 32 of the dog clutch 130 to connect the differential case 20 of the front differential 120 and the propeller shaft 140 to each other. Thus, the torque is transmitted from the engine 102 to the front wheels 104R, 104L and the rear wheels 105R, 105L.

On the other hand, when the four-wheel-drive vehicle 100 is travelling in the two-wheel-drive mode, energization of the magnet coil 80 is stopped to interrupt transmission of the driving force by the driving force transmission device 160, and the connection between the differential case 20 and the propeller shaft 140 by the dog clutch 130 is cancelled. By interrupting the transmission of driving force by the driving force transmission device 160, the connection between the drive shaft 115L of the left rear wheel 105L and the intermediate shaft 54 is cancelled, and accordingly, the driving force is no longer transmitted to the right rear wheel 105R. This is based on the general characteristic of a differential unit that, when one of output shafts rotates at idle, torque is no longer transmitted to the other one of the output shafts.

As described above, when the four-wheel-drive vehicle 100 is travelling in the two-wheel-drive mode, the transmission of torque by the driving force transmission system 106 is interrupted on the upstream side (engine 102 side) and on the downstream side (the rear wheel 105R, 105L side) of the propeller shaft 140, the rotations of the propeller shaft 140 and the differential case 50 of the rear differential 150 connected to the propeller shaft 140 with respect to a vehicle body are stopped. This reduces the travel resistance of the four-wheel-drive vehicle 100 caused by the rotational resistance of the propeller shaft 140 and the stirring resistance of lubricating oil by the ring gears 41a, 42a.

When the four-wheel-drive vehicle 100 is shifted from the two-wheel-drive mode to the four-wheel-drive mode, first, the amount of current that is supplied to the magnet coil 80 is gradually increased to allow the driving force transmission device 160 to transmit the torque of the rear wheels 105R, 105L to the propeller shaft 140, and thus the propeller shaft 140 is rotated. Then, the rotational speed of the propeller shaft 140 increases. When the difference between the rotational speed of the differential case 20 of the front differential 120, which is detected by the first rotational speed sensor 904, and the rotational speed of the ring gear 41a of the first gear mechanism 41, which is detected by the second rotational speed sensor 905, becomes equal to or lower than a threshold and thus synchronization between the differential case 20 and the ring gear 41a is completed, the dog clutch 130 is engaged.

On the other hand, when the four-wheel-drive vehicle 100 is shifted from the four-wheel-drive mode to the two-wheel-drive mode, the amount of current that is supplied to the magnet coil 80 is gradually reduced to eliminate torsion of the propeller shaft 140 caused by the torque transmitted toward the rear wheels 105R, 105L, and then the dog clutch 130 is disengaged. By switching the drive mode between the two-wheel-drive mode and the four-wheel-drive mode as described above, a shock at the time of switching of the drive mode is suppressed.

If the coefficient of friction between the wheels and a road surface is low because the road surface is wet due to rain or is frozen, or the four-wheel-drive vehicle 100 is travelling on a snowy road, a gravel road, or the like, a slip, which is a phenomenon in which the wheels spin out, is likely to occur when the four-wheel-drive vehicle 100 starts. Such a slip is more likely to occur in the two-wheel-drive mode where driving force is transmitted only to the front wheels 104R, 104L than in the four-wheel-drive mode where driving force is transmitted to the front wheels 104R, 104L and the rear wheels 105R, 105L.

When a slip has occurred while the four-wheel-drive vehicle 100 is travelling, the first tooth portion 31 and the second tooth portion 32 of the dog clutch 130 can be synchronized with each other by transmitting the torque of the rear wheels 105R, 105L to the propeller shaft 140 via the driving force transmission device 160 as described above and rotating the propeller shaft 140. However, because the rear wheels 105R, 105L are not rotating at the time when the four-wheel-drive vehicle 100 starts, it is not possible to synchronize the first tooth portion 31 and the second tooth portion 32 of the dog clutch 130 with each other in the above-described manner. According to the present embodiment, this problem is solved by executing a control described below.

Figure 4:
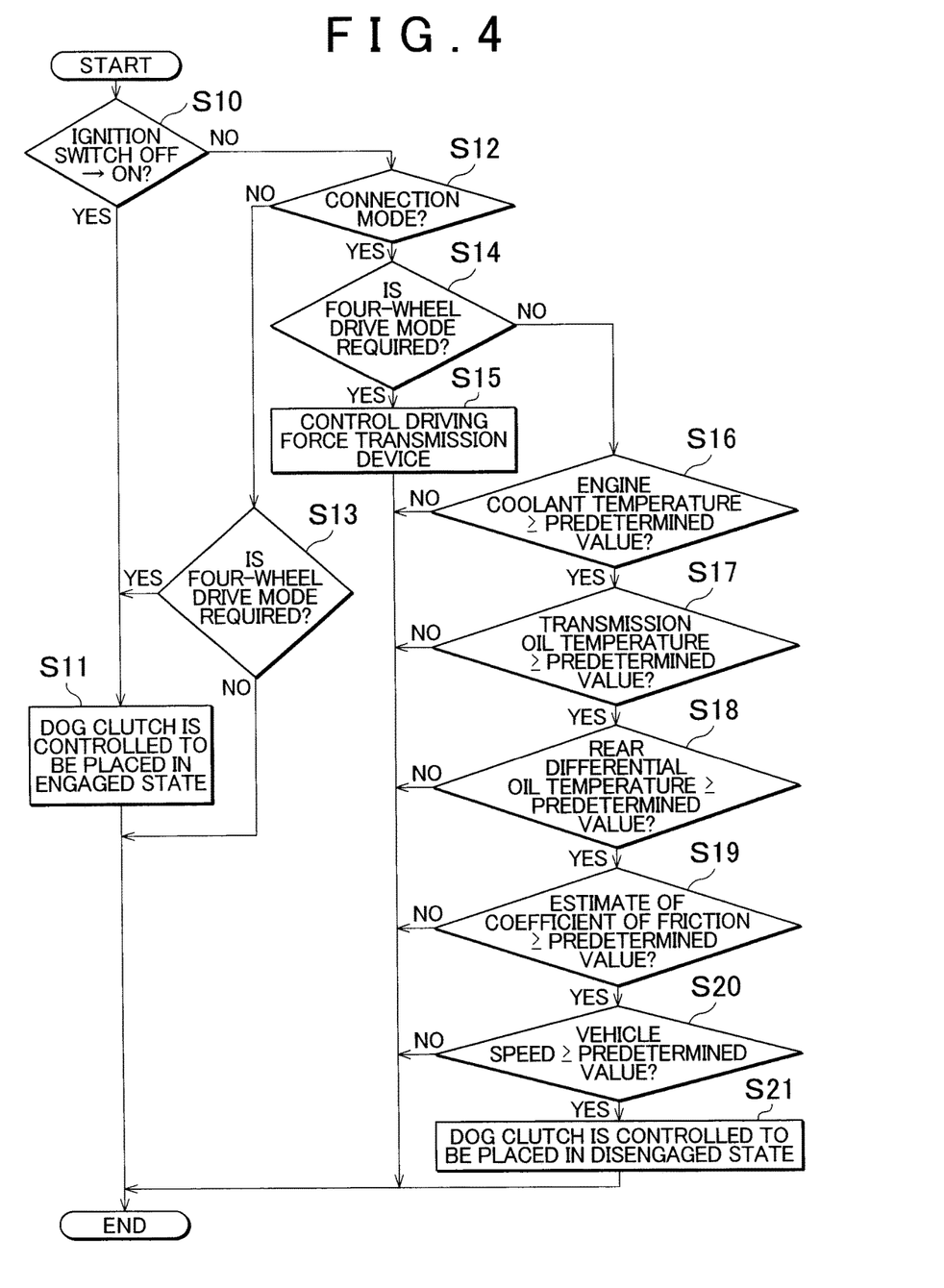
FIG. 4 is a flowchart illustrating an example of a procedure executed by a control unit of an ECU, which serves as a road surface state determination section and a control section.

FIG. 4 is a flowchart illustrating an example of a procedure executed by the control unit 92 of the ECU 9, which serves as the road surface state determination section 921 and the control section 922. Steps S10 to S15, S20, and S21 among all the steps illustrated in the flowchart are the processing that the control unit 92 executes as the control section 922. Steps S16 to S19 are the processing that the control unit 92 executes as the road surface state determination section 921. The control unit 92 executes the processing illustrated in the flowchart in FIG. 4 in predetermined control cycles (for example, 100 ms).

The control unit 92 determines whether the ignition switch 101 is brought into an on-state from an off-state, that is, whether the ignition switch 101 is switched to the on-state by a driver after the immediately preceding processing is executed (Step S10). When it is determined that the ignition switch 101 is brought into the on-state (YES in S10), the control unit 92 controls the dog clutch 130 to place the dog clutch 130 into the engaged state (Step S11). That is, the sleeve 33 is moved toward the first tooth portion 31 by the actuator 30 of the dog clutch 130, and the first tooth portion 31 and the second tooth portion 32 are connected to each other so as to be non-rotatable relative to each other by the sleeve 33.

When the ignition switch 101 is in the on-state before the immediately preceding processing is executed (NO in S10), the control unit 92 determines whether the second driving force transmission system 107 is in a connection mode (Step S12). The connection mode means that the dog clutch 130 is in the engaged state. When it is determined that the second driving force transmission system 107 is not in the connection mode (NO in S12), the control unit 92 determines whether the drive mode needs to be the four-wheel-drive mode (Step S13). The determination may be made on the basis of, for example, the state of a selector switch for switching the drive mode between the two-wheel-drive mode and the four-wheel-drive mode, which is operated by the driver, the rotational speed difference between the front wheels 104R, 104L and rear wheels 105R, 105L (difference between the average rotational speed of the front wheels 104R, 104L, and the average rotational speed of the rear wheels 105R, 105L), the accelerator operation amount, or the like. When it is determined that the drive mode needs to be the four-wheel-drive mode (YES in S13), the processing in step S11 is executed, whereas when it is determined that the drive mode need not be the four-wheel-drive mode (NO in S13), the processing in the flowchart illustrated in FIG. 4 is ended without executing the processing in step S11.

On the other hand, when it is determined that the second driving force transmission system 107 is in the connection mode (YES in S12), the control unit 92 determines whether the driving force needs to be transmitted to the rear wheels 105R, 105L, that is, whether the drive mode needs to be the four-wheel drive mode (Step S14). The determination may be made in the same manner as that in the processing of Step S13. When the drive mode needs to be the four-wheel drive mode (YES in S14), the control unit 92 controls the driving force transmission device 160 to adjust the driving force that is transmitted to the rear wheels 105R, 105L (Step S15). The control unit 92 controls the driving force transmission device 160, for example, such that the larger the rotational speed difference between the front wheels 104R, 104L and the rear wheels 105R, 105L is, or the larger the accelerator operation amount is, the larger the driving force that is transmitted to the rear wheels 105R, 105L is.

When it is determined in Step S14 that the drive mode need not be the four-wheel-drive mode (NO in S14), the control unit 92 executes the processing in Step S16 and the following steps. Note that, a case where it is determined that the drive mode need not be the four-wheel drive mode means a case where the ignition switch 101 is brought into the on-state from the off-state and thereby the dog clutch 130 is engaged and brought into the connection mode in the processing in step S11, but such a slip that the wheels spin out does not occur, and there is no problem even if the engagement of the dog clutch 130 is cancelled.

In this case, the control unit 92 determines whether the engine coolant temperature (temperature of the engine 102) detected by the coolant temperature sensor 901 is equal to or higher than a predetermined value (for example, 0° C.) (Step S16). When it is determined that the engine coolant temperature is neither equal to nor higher than the predetermined value (NO in S16), the control unit 92 ends the processing in the flowchart illustrated in FIG. 4.

On the other hand, when it is determined that the engine coolant temperature is equal to or higher than the predetermined value (YES in S16), the control unit 92 determines whether the oil temperature (temperature of the transmission 103) of the transmission 103, which is detected by the oil temperature sensor 902, is equal to or higher than a predetermined value (for example, 0° C.) (Step S17). When it is determined that the oil temperature of the transmission 103 is neither equal to nor higher than the predetermined value (NO in S17), the control unit 92 ends the processing in the flowchart illustrated in FIG. 4.

On the other hand, when it is determined that the oil temperature of the transmission 103 is equal to or higher than the predetermined value (YES in S17), the control unit 92 determines whether the oil temperature (temperature of the second driving force transmission system 107) of the rear differential 150 is equal to or higher than a predetermined value (for example, 0° C.) (Step S18). Although the oil temperature of the rear differential 150 may be obtained on the basis of the value detected by, for example, a temperature sensor provided near the rear differential 150, the oil temperature may be obtained by calculation executed on the basis of, for example, an integrated value of the driving force transmitted by the driving force transmission device 160. When it is determined that the oil temperature of the rear differential 150 is neither equal to nor higher than the predetermined value (NO in S18), the control unit 92 ends the processing in the flowchart illustrated in FIG. 4.

On the other hand, when it is determined that the oil temperature of the rear differential 150 is equal to or higher than the predetermined value (YES in S18), the control unit 92 calculates an estimate of the coefficient of friction of a road surface on the basis of, for example, the rotational speed difference between the front wheels 104R, 104L and the rear wheels 105R, 105L, the steered angle of the front wheels 104R, 104L, or the like, and determines whether the estimate is equal to or higher than a predetermined value (Step S19). That is, when the rotational speed difference between the front wheels 104R, 104L and the rear wheels 105R, 105L is larger than a value corresponding to the steered angle by a predetermined amount, it is considered that a slip has occurred between the front wheels 104R, 104L or the rear wheels 105R, 105L, and the road surface. Therefore, the coefficient of friction of the road surface is estimated on the basis of the rotational speed difference. Note that, the predetermined value in Step S19 is a value of the coefficient of friction of the road surface, at which the possibility that the front wheels 104R, 104L or the rear wheels 105R, 105L will slip (spin out) is considered to be low. In addition, the estimate of the coefficient of friction in Step 19 may be acquired from a steering device that steers the front wheels 104R, 104L. That is, if a reaction force when the front wheels 104R, 104L, which are steered wheels, are steered is small, it is considered that a slip has occurred between the front wheels 104R, 104L and the road surface. Therefore, the coefficient of friction of the road surface is estimated on the basis of the steering reaction force. When it is determined that the estimate of the coefficient of friction of the road surface is neither equal to nor higher than the predetermined value (NO in S19), the control unit 92 ends the processing in the flowchart illustrated in FIG. 4.

On the other hand, when it is determined that the estimate of the coefficient of friction of the road surface is equal to or higher than the predetermined value (YES in S19), the control unit 92 determines whether the vehicle speed of the four-wheel-drive vehicle 100 is equal to or higher than a predetermined value (Step S20). The predetermined value is a vehicle speed at which the four-wheel-drive vehicle 100 can be determined to have come out of the starting state, and for example, 20 km/h may be set as the predetermined value in Step S20. When it is determined that the vehicle speed is neither equal to nor higher than the predetermined value (NO in Step S20), the control unit 92 ends the processing in the flowchart illustrated in FIG. 4.

On the other hand, when it is determined that the vehicle speed is equal to or higher than the predetermined value (YES in Step S20), the control unit 92 controls the dog clutch 130 to place the dog clutch 130 into the disengaged state (Step S21). That is, the sleeve 33 is moved toward the second tooth portion 32 by the actuator 30 of the dog clutch 130, and the connection between the first tooth portion 31 and the second tooth portion 32 by the sleeve 33 is cancelled. This allows the second driving force transmission system 107 to shift from the connection mode to a disconnection mode.

Note that, it is desirable that the predetermined values in the processing in steps S16 to S18 be set to be within a range of temperatures (for example, from −5° C. to 5° C.) at which there is a possibility that the road surface may be frozen. That is, the control unit 92 determines whether there is a possibility that the road surface is frozen, that is, whether the coefficient of friction of the road surface is equal to or higher than a predetermined value, on the basis of the engine coolant temperature, the transmission oil temperature, and the rear differential oil temperature. The values, such as the engine coolant temperature, the transmission oil temperature, and the rear differential oil temperature in Steps S16 to S18, and the rotational speed difference between the front wheels 104R, 104L and the rear wheels 105R, 105L, which is used to calculate the estimate of the coefficient of friction in Step S19, are examples of index values regarding the coefficient of friction of the road surface.

As described above, the control unit 92 controls the dog clutch 130 to bring the dog clutch 130 into the engaged state irrespective of the index values regarding the coefficient of friction of the road surface when the ignition switch 101 is operated into the on-state, and controls the dog clutch 130 to bring the dog clutch 130 into the disengaged state when it is determined by the processing in steps S16 to S19, that the coefficient of friction of the road surface is equal to or higher than the predetermined value. In addition, the control unit 92 controls the dog clutch 130 to bring the dog clutch 130 into the disengaged state on the condition that the vehicle speed is equal to or higher than the predetermined value.

According to the present embodiment, when the ignition switch 101 is operated into the on-state, the dog clutch 130 is immediately brought into the engaged state. Thus, if a slip occurs in the front wheels 104R, 104L even when the four-wheel-drive vehicle 100 starts immediately after starting of the engine 102, it is possible to rapidly distribute driving force to the rear wheels 105R, 105L by controlling the driving force transmission device 160. That is, when the four-wheel-drive vehicle 100 starts in the disconnection mode, that is, the disengaged state in which the dog clutch 130 is disengaged, and a slip occurs in the front wheels 104R, 104L, driving force cannot be distributed to the rear wheels 105R, 105L unless the dog clutch 130 is brought into the engaged state. However, when the front wheels 104R, 104L slip, the rotational speed difference between the front wheels 104R, 104L and the rear wheels 105R, 105L is large, the rotation of the first tooth portion 31 and the rotation of the second tooth portion 32 in the dog clutch 130 are not synchronized with each other, and the first tooth portion 31 and the second tooth portion 32 cannot be connected to each other by the sleeve 33. However, in the present embodiment, the four-wheel-drive vehicle 100 is allowed to start in the engaged state where the dog clutch 130 is engaged. Thus, it is possible to quickly converge the slip at the starting of the four-wheel-drive vehicle 100.

In addition, the dog clutch 130 is brought into the disengaged state on the condition that the vehicle speed is equal to or higher than the predetermined value. Thus, after the four-wheel-drive vehicle 100 comes out of the starting state, that is, a state where the first tooth portion 31 and the second tooth portion 32 in the dog clutch 130 are easily synchronized with each other is achieved, the second driving force transmission system 107 is brought into the disconnection mode. This improves the travelling stability of the four-wheel-drive vehicle 100.

While the example embodiment of the invention has been described above, the invention is not limited to the above-described embodiment, and may be implemented in various other modified embodiments within the scope of the invention. For example, in the above-described embodiment, the dog clutch 130 is arranged between the propeller shaft 140 and the differential case 20 of the front differential 120 in the driving force transmission system, and the driving force transmission device 160 is arranged between the rear differential 150 and the left rear wheel 105L. However, this arrangement may be inverted. Alternatively, the driving force transmission device 160 may be arranged between the propeller shaft 140 and the rear differential 150.

The processing in at least one of step S16 to Step S19 may be omitted. Moreover, a step of ending the processing in the flowchart illustrated in FIG. 4 when the value detected by the ambient temperature sensor 903 is neither equal to nor higher than the predetermined value may be added.

According to the invention, it is possible to reliably engage the dog clutch in the driving force transmission system before the vehicle starts.

What is claimed is:

1. A four-wheel-drive vehicle comprising:
a drive source that is able to generate driving force for a vehicle once the drive source is started, and which is capable of being started without generating driving force for the vehicle at the time that the drive source is started;
a first driving force transmission system that transmits the driving force to main drive wheels;
a second driving force transmission system that transmits the driving force to auxiliary drive wheels;
an operation receiving device that receives a starting operation for starting the drive source; and
a control device that controls the second driving force transmission system,
wherein the second driving force transmission system includes a dog clutch that transmits the driving force when a recessed portion and a projected portion of the dog clutch are engaged with each other, and a driving force transmission device that is able to continuously adjust the driving force to be transmitted, and
wherein the control device includes a road surface state determination section that determines whether a coefficient of friction of a road surface is equal to or higher than a predetermined value based on an index value regarding the coefficient of friction of the road surface, controls the dog clutch such that the recessed portion and the projected portion are invariably engaged with each other in response to a determination that the operation receiving device receives the starting operation for starting the drive source so that the recessed portion and the projected portion of the dog clutch invariably become engaged with each other whenever it is determined that the operation receiving device receives the starting operation for starting the drive source, and irrespective of the index value regarding the coefficient of friction of the road surface, and controls the dog clutch such that engagement between the recessed portion and the projected portion is cancelled when the road surface state determination section determines that the coefficient of friction of the road surface is equal to or higher than the predetermined value.

2. The four-wheel-drive vehicle according to claim 1, wherein the control device controls the dog clutch such that the engagement between the recessed portion and the projected portion is cancelled on condition that a vehicle speed is equal to or higher than a predetermined value.

3. The four-wheel-drive vehicle according to claim 2, wherein the index value regarding the coefficient of friction of the road surface includes at least one of a temperature of the drive source, a temperature of a shifting device that changes a speed of rotation output from the drive source, a temperature of the second driving force transmission system, a rotational speed difference between the main drive wheels and the auxiliary drive wheels, and a steering reaction force.

4. The four-wheel-drive vehicle according to claim 1, wherein the index value regarding the coefficient of friction of the road surface includes at least one of a temperature of the drive source, a temperature of a shifting device that changes a speed of rotation output from the drive source, a temperature of the second driving force transmission system, a rotational speed difference between the main drive wheels and the auxiliary drive wheels, and a steering reaction force.

5. A four-wheel-drive vehicle comprising:
a drive source that generates driving force for a vehicle once the drive source is started, and which starts without generating driving force for the vehicle at the time that the drive source is started;
a first driving force transmission system that transmits the driving force to main drive wheels;
a second driving force transmission system that transmits the driving force to auxiliary drive wheels;
an operation receiving device that receives a starting operation for starting the drive source; and
a control device that controls the second driving force transmission system,
wherein the second driving force transmission system includes a dog clutch that transmits the driving force when a recessed portion and a projected portion of the dog clutch are engaged with each other, and a driving force transmission device that is able to continuously adjust the driving force to be transmitted, and
wherein the control device includes a road surface state determination section that determines whether a coefficient of friction of a road surface is equal to or higher than a predetermined value based on an index value regarding the coefficient of friction of the road surface, wherein the road surface state determination section comprises
dog clutch engagement control means for controlling the dog clutch such that the recessed portion and the projected portion invariably become engaged with each other in response to a determination that the operation receiving device receives the starting operation for starting the drive source so that the recessed portion and the projected portion of the dog clutch are engaged with each other whenever it is determined that the operation receiving device receives the starting operation for starting the drive source, and irrespective of the index value regarding the coefficient of friction of the road surface, and dog clutch disengagement control means for controlling the dog clutch such that engagement between the recessed portion and the projected portion is cancelled when the road surface state determination section determines that the coefficient of friction of the road surface is equal to or higher than the predetermined value.

6. The four-wheel-drive vehicle according to claim 5, wherein the dog clutch disengagement control means controls the dog clutch such that the engagement between the recessed portion and the projected portion is cancelled on condition that a vehicle speed is equal to or higher than a predetermined value.

7. The four-wheel-drive vehicle according to claim 6, wherein the index value regarding the coefficient of friction of the road surface includes at least one of a temperature of the drive source, a temperature of a shifting device that changes a speed of rotation output from the drive source, a temperature of the second driving force transmission system, a rotational speed difference between the main drive wheels and the auxiliary drive wheels, and a steering reaction force.

8. The four-wheel-drive vehicle according to claim 5, wherein the index value regarding the coefficient of friction of the road surface includes at least one of a temperature of the drive source, a temperature of a shifting device that changes a speed of rotation output from the drive source, a temperature of the second driving force transmission system, a rotational speed difference between the main drive wheels and the auxiliary drive wheels, and a steering reaction force.

* * * * *